Aug. 8, 1944.  L. E. BARTON  2,355,502
SIGNAL INDICATOR AND RECORDER
Filed Feb. 27, 1941    2 Sheets-Sheet 1
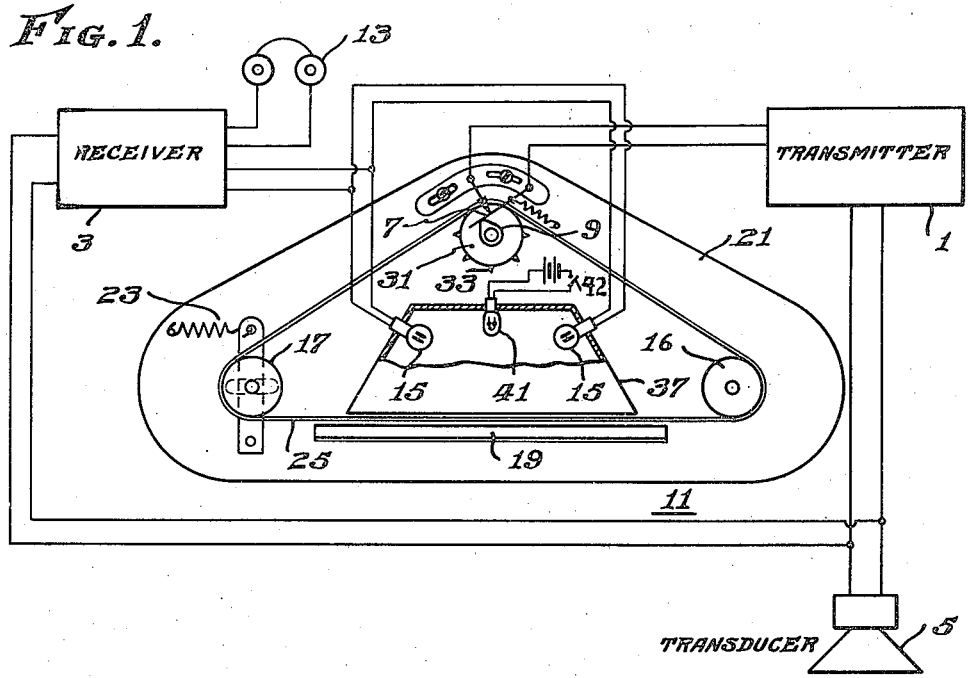
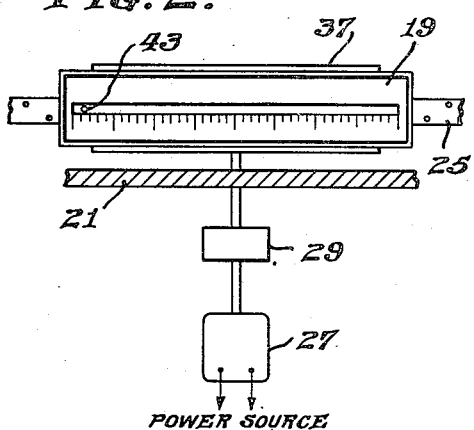 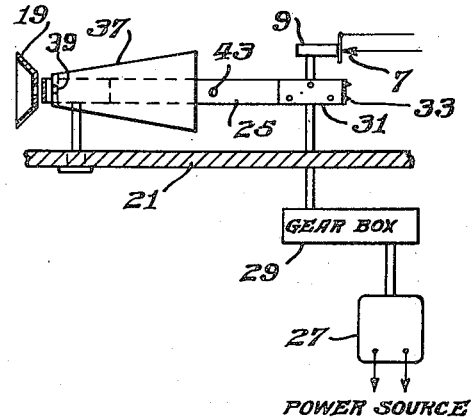
Inventor
Loy E. Barton
By
Attorney Aug. 8, 1944.  L. E. BARTON  2,355,502
SIGNAL INDICATOR AND RECORDER
Filed Feb. 27, 1941  2 Sheets-Sheet 2
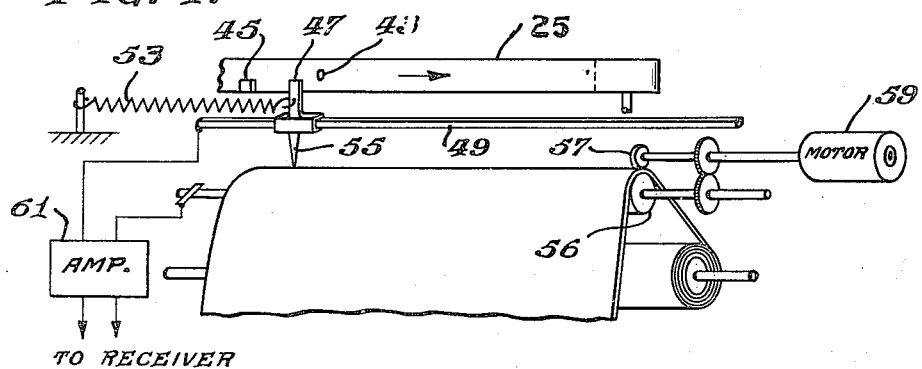
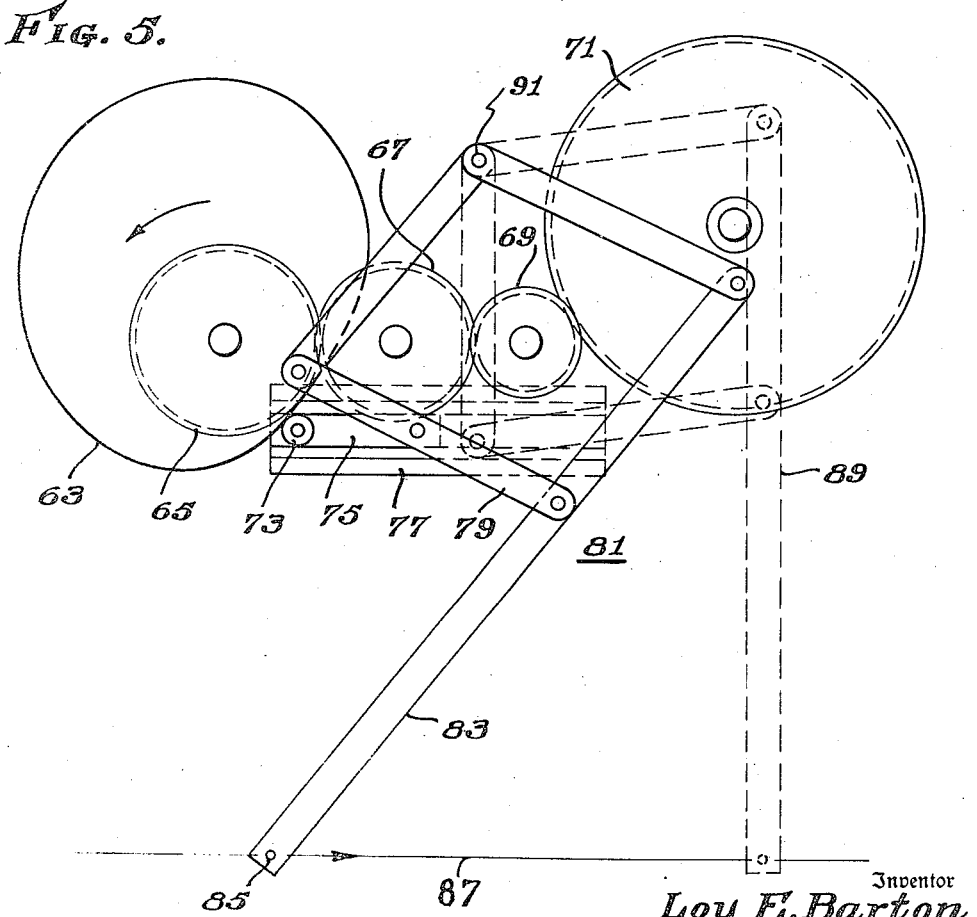
Inventor
Loy E. Barton Patented Aug. 8, 1944

2,355,502

UNITED STATES PATENT OFFICE 2,355,502

SIGNAL INDICATOR AND RECORDER

Loy E. Barton, Collingswood, N. J., assignor to Radio Corporation of America, a corporation of Delaware Application February 27, 1941, Serial No. 380,805

6 Claims. (Cl. 177—386)

This invention relates to signal indicators and recorders and particularly to a linear type indicator for indicating the reflections produced in underwater distance measurements.

Distances are measured by producing a submarine compressional signal which is received after reflection from the ocean bottom, remote object or other reflecting body. Since the velocity of propagation through water is known, distance may be indicated as a function of time. Various types of indicators have been used. Some of these indicators are calibrated directly in units of distance which is indicated by observing the position of a light flashed by the received signal. When the reflected signals are weak, it is often difficult to distinguish them from the background by visual observation. However, it has been found that the reflected signals may be distinguished aurally and the indicator used as a timing device by moving the indicator across its scale at a uniform rate and associating the aural signal with the indicator position. In other words, the indicator is used as the second hand of a watch.

One of the objects of the instant invention is to provide means for indicating and recording the reception of distance measuring signals. Another object is to provide means for indicating reflected signals on a timing scale. Another object is to provide means for timing by visual or aural means, or by both visual and aural means, distance measuring submarine signals. An additional object is to provide means for changing the color of a visual signal indicator to observe thereby the reception of signals.

The invention will be described by referring to the accompanying drawings in which Figure 1 is a plan view, partly schematic, of one embodiment of the invention; Figures 2 and 3 are elevational and end views, respectively, of portions of the signal indicator of the invention; Figure 4 is a perspective view of a signal recorder; and Figure 5 is a plan view of a modification of the signal recorder. Similar reference characters denote similar elements in the drawings.

Referring to Fig. 1, a transmitter 1, and a receiver 3 are connected to a transducer or sound projector 5. The transmitter is preferably of the pulse type and is keyed by a switch 7 operated by a cam 9 in the indicator or timing device 11. The receiver 3 is connected to apply the received signals to telephones or other aural indicator 13 and to gaseous discharge tubes 15 or other quick operating light valves in the timing device.

Now referring to the indicator proper 11, a pair of idler pulleys 16, 17 are mounted adjacent the ends of a scale 19 on a base 21. One of the pulleys is provided with a take-up device 23 which assures constant tension on the belt 25 carried by the pulleys. A synchronous and preferably constant speed motor 27 is mounted on the base and is connected through reduction gear 29 to a drive pulley 31. The drive pulley is provided with staggered sprocket teeth 33 which engage staggered sprocket holes in the belt 25. The drive pulley is arranged behind the idler pulleys so that the belt only engages a small surface and a few teeth to eliminate excessive friction to provide low friction indexing of the sprocket holes and teeth. The cam 9 may be mounted on the top of the drive pulley 31 so that the cam operates the switch 7 which may be mounted on the base. The switch mounting or the cam or both are preferably mounted so that the operating point may be synchronized with the zero scale position.

The gaseous discharge tubes 15 are located within a reflector 37 which is arranged with a slit 39 behind and parallel to the scale 19. An incandescent light 41 is also located within the reflector and is connected to a suitable power source. Light from both the gaseous discharge tubes and the incandenscent light is applied through the slit 39 to the belt 25, which is opaque in the plane of the slit 39 except for one or more apertures 43. The aperture image is indicated as it moves along on the scale 19 which is preferably made of light diffusing or transparent material.

The operation of the device is as follows: The motor 27 drives the pulley 33 at constant speed so that the belt moves at a given speed along the longitudinal axis of the scale 19. The index aperture 43 is arranged to pass the zero of the scale at the instant the cam switch 7 pulses the transmitter 1. The outgoing pulse is radiated from the diaphragm of the transducer 5. The pulse travels at a known velocity through the medium and returns, after reflection, to set up a signal current in the transducer. The signal current is amplified and detected in the receiver 3. The detected signal produces an aural signal in the telephones 13 and flashes the gaseous discharge lamps 15. During the propagation of the signal the belt aperture 43 will move along the scale 19, which may be calibrated to indicate distance in any desired units, and its image will appear at the instant the signal is received.

If the incandescent light has been turned on by closing a switch 42 in circuit therewith, the aperture will be illuminated continuously and its image will move along the scale as a timing mark. The operator may then either observe the changing of the color of the image due to the gaseous discharge or, if the signal is not sufficient to flash the lamp 15, the operator may associate the aural signal with the indicator position to determine the distance. Furthermore, both aural and visual indications may be used. The color contrast may be obtained by using incandescent and gaseous discharge light or similar light valves may be used with a filter.

Several index apertures are used so that the timing movements successively follow each other and are properly synchronized with the transmitter pulsing. The gearing may be arranged so that the scale may be calibrated to correspond to two or more maximum ranges. In the event that two ranges are used, a second cam switch may be substituted for the first switch to obtain the proper synchronization of the outgoing pulses.

If recording of the signals is desired, index pins 45 may be attached to belt 25 at points corresponding to every other aperture 43. These pins engage a slider 47 which is carried along a rod 49 parallel to the belt. Upon reaching the extreme right, the rotation of the belt around the pulley 15 disengages the slider which is restored to its initial position by a biasing spring 53. A stylus 55 on the slider engages a paper treated for electrical or any other suitable type of recording. The paper is fed over a contact roller 56 by a pulley 57 driven by a paper feed motor 59. The slider rod 49 and the contact roll 56 are connected through an amplifier 61 to the receiver output terminals. The recording is done electrolytically by impressing amplified currents corresponding to the received signals upon a suitably treated paper. In this manner, the instantaneous position of the stylus is recorded on the paper as the signals are received. The recorder may be operated by a separate belt system, driven through suitable gearing connected to the main driving motor 27 by means of which the recording paper width may be made longer or shorter than the indicator scale.

A modification of the stylus moving mechanism is shown in Fig. 5. The modification substitutes for the belt driven stylus 55 of Fig. 4 a cam and pantograph mechanism which is arranged as follows: A cam 63 is connected through gears 65, 67, 69 to a gear 71 which is driven in synchronism with the drive pulley 31. A cam follower 73 is arranged on a connecting link 75 which is operated in guides 77 so that the member 75 may be biased to follow the cam. The connecting link 75 is attached to one arm 79 of a pantograph 81. The long arm 83 of the pantograph carries the stylus 85 which is similar to the stylus 55 of Fig. 4. The stylus moves linearly along line 87. The extreme right hand position of the pantograph is illustrated by the broken lines 89. The pantograph is pivoted at point 91. The length of stylus travel may be regulated by adjusting the pivot point with respect to the center of the operating cam 63.

Thus, the invention has been described as a signal indicator for observing and recording distance measuring signals. The signals may be observed visually or aurally or both. The indications may be obtained by using an image of one color which is moved at a constant rate across a suitably calibrated scale and associating with the moving image an aurally received signal. The indications may be observed visually by employing a light of different color, responsive to the received signal. Furthermore, the signals may be recorded on a moving paper.

I claim as my invention:

1. A signal indicator including in combination a drive pulley including sprocket teeth, at least one idler pulley, a belt including an index and sprocket holes for said sprocket teeth, said belt engaging said idler pulley and engaging approximately one-quarter of the driving surface and one-quarter of the sprocket teeth of said drive pulley to reduce driving friction and to provide low friction indexing of said sprocket holes and teeth, means for rotating said drive pulley at substantially constant speed, switching means operated by said rotating means and in synchronism therewith to control a signal to be indicated, a light source for illuminating said index with light of one color, a light valve for applying to said index light of a contrasting color, and a scale arranged to receive signal indicating light from said index.

2. A signal indicator including in combination a drive pulley including sprocket teeth, at least one idler pulley, a belt including an aperture index and sprocket holes for said sprocket teeth, said belt engaging said idler pulley and engaging substantially less than one-half of the driving surface and substantially less than one-half of the sprocket teeth of said drive pulley to reduce driving friction and to provide low friction indexing of said sprocket holes and teeth, means for rotating said drive pulley at substantially constant speed, switching means operated by said rotating means and in synchronism therewith to control a signal to be indicated, a light source for illuminating said aperture index with light of one color, a light valve for applying to said aperture index light of a contrasting color, and a scale arranged to receive signal indicating light from said aperture index.

3. A signal indicator including in combination a drive pulley including sprocket teeth, an idler pulley, a belt including at least one aperture index and sprocket holes for said sprocket teeth, said belt engaging said idler pulley and engaging substantially less than one-half of the driving surface and sprocket teeth of said drive pulley to minimize driving friction and to provide low friction indexing of said sprocket holes and teeth, means for rotating said drive pulley at substantially constant speed, a wave transmitter, means cooperatively connected to said drive pulley for pulsing said wave transmitter to radiate a wave therefrom, a receiver responsive to the reflected wave from said transmitter, a light source positioned to apply light of one color to said aperture, and a light valve adapted to supply light of a contrasting color, said light valve being positioned to apply its light to said aperture and being responsive to said received reflected wave whereby to produce a change in color of the light in said aperture, and a scale arranged to receive said light from said aperture.

4. A signal indicator including, in combination, a drive pulley, an idler pulley, a belt trained around said pulleys and engaging substantially less than one half of the driving surface of said drive pulley to minimize driving friction, means for rotating said drive pulley at substantially constant speed, a wave transmitter, means cooperatively connected to said drive pulley for pulsing said wave transmitter to radiate a wave therefrom toward a reflecting object, a receiver responsive to the wave reflected from said object, indicating means comprising a relatively stationary reference index and a cooperative, illuminable index on said belt movable with said belt relative to said stationary index, a light source positioned to apply light of one color to said movable index, and light valve means adapted to supply light of a contrasting color, said light valve means being responsive to said reflected wave and being positioned to apply the light thereof to said movable index whereby to produce a change in color of the light of said movable index.

5. The invention set forth in claim 4 characterized in that said stationary index comprises a scale including a reference starting indication, characterized further in that said movable index is normally at some point removed from said starting indication, and characterized still further in that said belt and said pulsing means are so related that said movable index is positioned by said belt at said starting indication simultaneously with the pulsing of said transmitter by said pulsing means.

6. The invention set forth in claim 4 characterized in that said light valve means comprises a plurality of discrete light valves connected electrically in parallel relation to the output of said receiver.

LOY E. BARTON.